(12) United States Patent
Togita

(10) Patent No.: US 7,471,872 B2
(45) Date of Patent: Dec. 30, 2008

(54) REPRODUCING APPARATUS FOR DATA STORED IN DISK-SHAPE STORAGE MEDIA

(75) Inventor: Kouji Togita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 910 days.

(21) Appl. No.: 10/841,580

(22) Filed: May 6, 2004

(65) Prior Publication Data

US 2004/0240851 A1    Dec. 2, 2004

(30) Foreign Application Priority Data

May 30, 2003    (JP)    ............... 2003-154836

(51) Int. Cl.
*G11B 27/00*    (2006.01)

(52) U.S. Cl. .............. 386/55; 386/46; 386/52; 386/124; 369/47.13

(58) Field of Classification Search ............ 386/46, 386/52, 55, 68, 69, 81, 82, 124–126; 360/75, 360/78.06; 369/47.1, 47.3, 47.11, 47.13
See application file for complete search history.

(56) References Cited

U.S. PATENT DOCUMENTS 6,144,391 A * 11/2000 Hinson et al. ............... 345/540
6,424,789 B1 * 7/2002 Abdel-Mottaleb ............ 386/52
6,839,308 B2 * 1/2005 Kotani ..................... 369/47.32
2002/0051408 A1   5/2002 Tadashi
2002/0141739 A1  10/2002 Tetsu
2002/0145702 A1  10/2002 Motoki
2002/0159186 A1* 10/2002 Kotani ......................... 360/75
2005/0019007 A1*  1/2005 Kato et al. .................... 386/69

FOREIGN PATENT DOCUMENTS

| JP | H09-270982 A | 10/1997 |
| JP | 2001-195840 A | 7/2001 |
| JP | 2002-150503 A | 5/2002 |
| JP | 2002-158974 A | 5/2002 |
| JP | 2002-175680 A | 6/2002 |
| JP | 2002-300532 A | 10/2002 |
| JP | 2003-016764 A | 1/2003 |

* cited by examiner

*Primary Examiner*—Thai Tran
*Assistant Examiner*—Mishawn Dunn
(74) *Attorney, Agent, or Firm*—Canon U.S.A., Inc., IP Division

(57) ABSTRACT

A reproducing apparatus performing reproduction of a play list by inserting a frozen image when the length of data of a clip to be referred by the play list is smaller than the minimum unit which is capable of continuing reproduction of video/audio (Continuous Data Area (CDA)), or by combining the clip equal to or smaller than the CDA with part of another clip to be referred by the play list to generate a new combined clip having a length equal to or longer than the CDA, and changing a reference clip in the play list into the combined clip.

12 Claims, 5 Drawing Sheets

REPRODUCING APPARATUS FOR DATA STORED IN DISK-SHAPE STORAGE MEDIA

BACKGROUND OF THE INVENTION

1. Field of the Invention

The present invention relates to a reproducing apparatus for reproducing information such as moving images, still images, or sound stored in storage media, such as random access disks.

2. Related Art of the Invention

Currently, camera-integrated storing and reproducing apparatuses (hereinafter referred to as a "digital video recorder"), which employ a disk-shaped storage medium (hereinafter referred to as a "disk") such as a semiconductor memory card or a DVD (Digital Versatile Disc) are in the market as storage media. Products, such as digital video recorders, that use disks as their storage media are characterized by the ability to provide random access to the storage media, which has been impossible in products using magnetic tape as their storage media.

For example, in the digital video recorder described above, video data, still image data, and audio data are generated as a file corresponding to recorded scenes and are stored in a disk or the like. When attempting to reproduce the recorded data, an easy and high-speed reproduction operation may be achieved by directly accessing a given file.

In the field of disk reproducing apparatus, program reproduction using a play list is a known approach to reproducing specific scenes in the respective files stored in the disk. As a technology for preparing such a play list in the digital video recorder, Japanese Unexamined Patent Application Publication No. 2002-175680 is already known in the related art.

In a DVD format, which is one of the standards of the disk-shaped storage medium, the smallest storage unit which satisfies a length required for enabling continuous reproduction of video or audio data is specified. The smallest storage unit is referred to as "Continuous Data Area" (CDA). By complying with the CDA, continuous reproduction is ensured.

When preparing the play list as described above, by designating a given scene in the respective files stored on the disk, a user can make the play list refer the given scene. However, there is a problem that when a scene which is shorter than the CDA is specified, continuous reproduction cannot be guaranteed. In particular, in a case where the user wants to pick up an instantaneous scene taken and stored by the user using a digital video recorder, and to connect that scene with other scenes to reproduce a play list, the desired scenes cannot be reproduced continuously due to the restriction of the CDA.

SUMMARY OF THE INVENTION

An object of the present invention is to solve the above-described problems.

Another object of the invention is to provide a reproducing apparatus with which the user can execute reproduction of the play list in spite of the restriction of the CDA.

As a preferred embodiment for such objects, the reproducing apparatus according to the present invention discloses a reproducing apparatus which can reproduce image data stored in a storage medium according to a play list in which a reproduction procedure comprises: a generating unit for combining a first image data to be referred by a play list with part of or an entire second image data to be referred by the play list for generating a combined clip; and a reproducing unit which reproduces the combined clip when reproducing according to said play list if the length of said first image data to be referred by said play list is shorter than a predetermined length.

The reproducing apparatus according to the invention also discloses a reproducing apparatus which can reproduce image data stored in a storage medium according to a play list in which a reproducing procedure comprises: an output unit for outputting a still image data at a boundaries between a plurality of image data when reproducing; and a reproducing unit which reproduces said still image data following through the reproduction of the image data when reproducing according to the play list if the length of the image data to be referred by the play list is shorter than a predetermined length.

Still other objects of the present invention, and the advantages thereof, will become fully apparent from the following detailed description of the embodiments.

DETAILED DESCRIPTION OF THE PREFERRED EMBODIMENTS

The preferred embodiment of the present invention will now be described in detail hereinafter with reference to the accompanying drawings.

Figure 1:
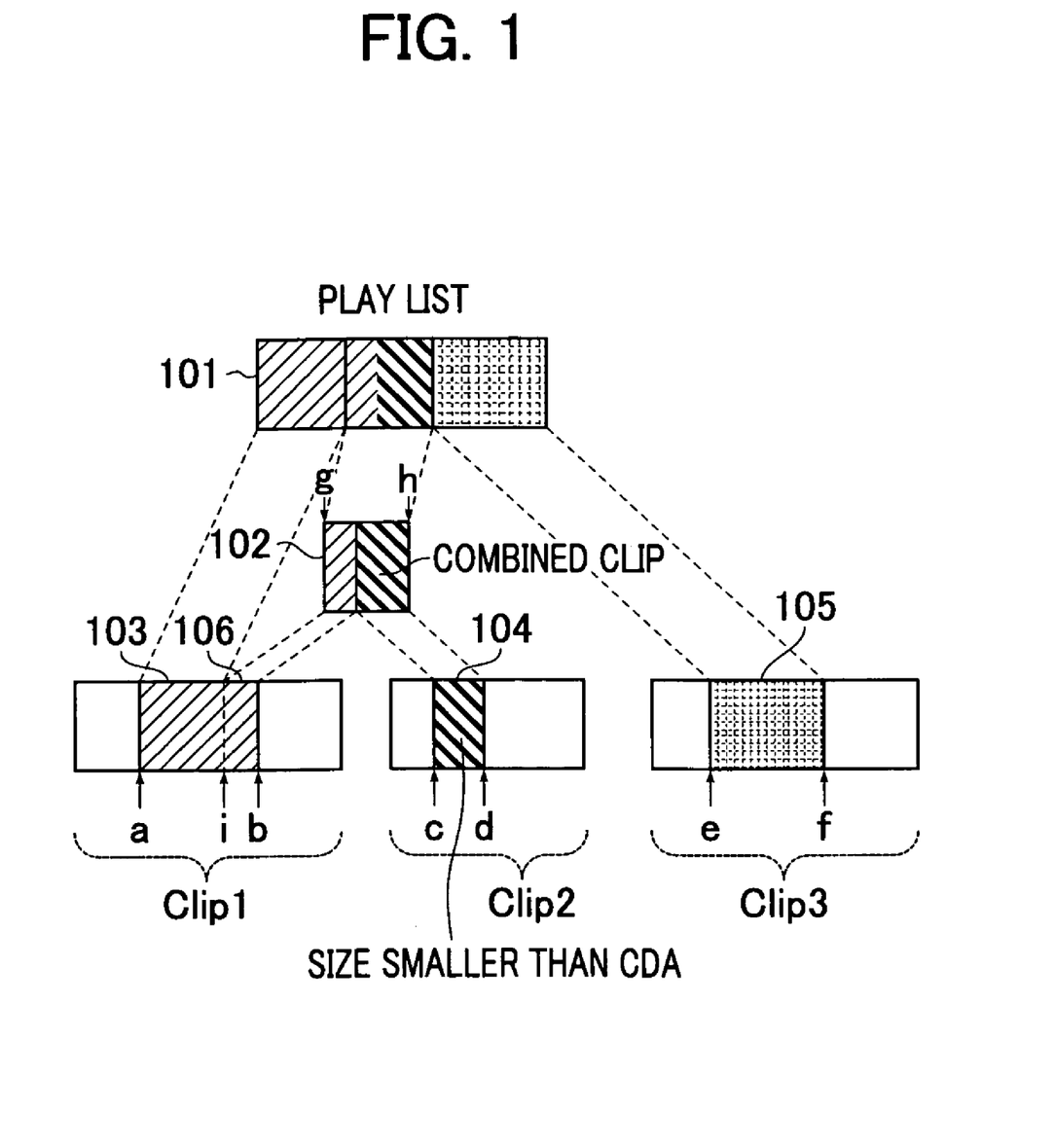
FIG. 1 is a conceptual drawing of a play list used in an embodiment of the present invention.
Figure 2:
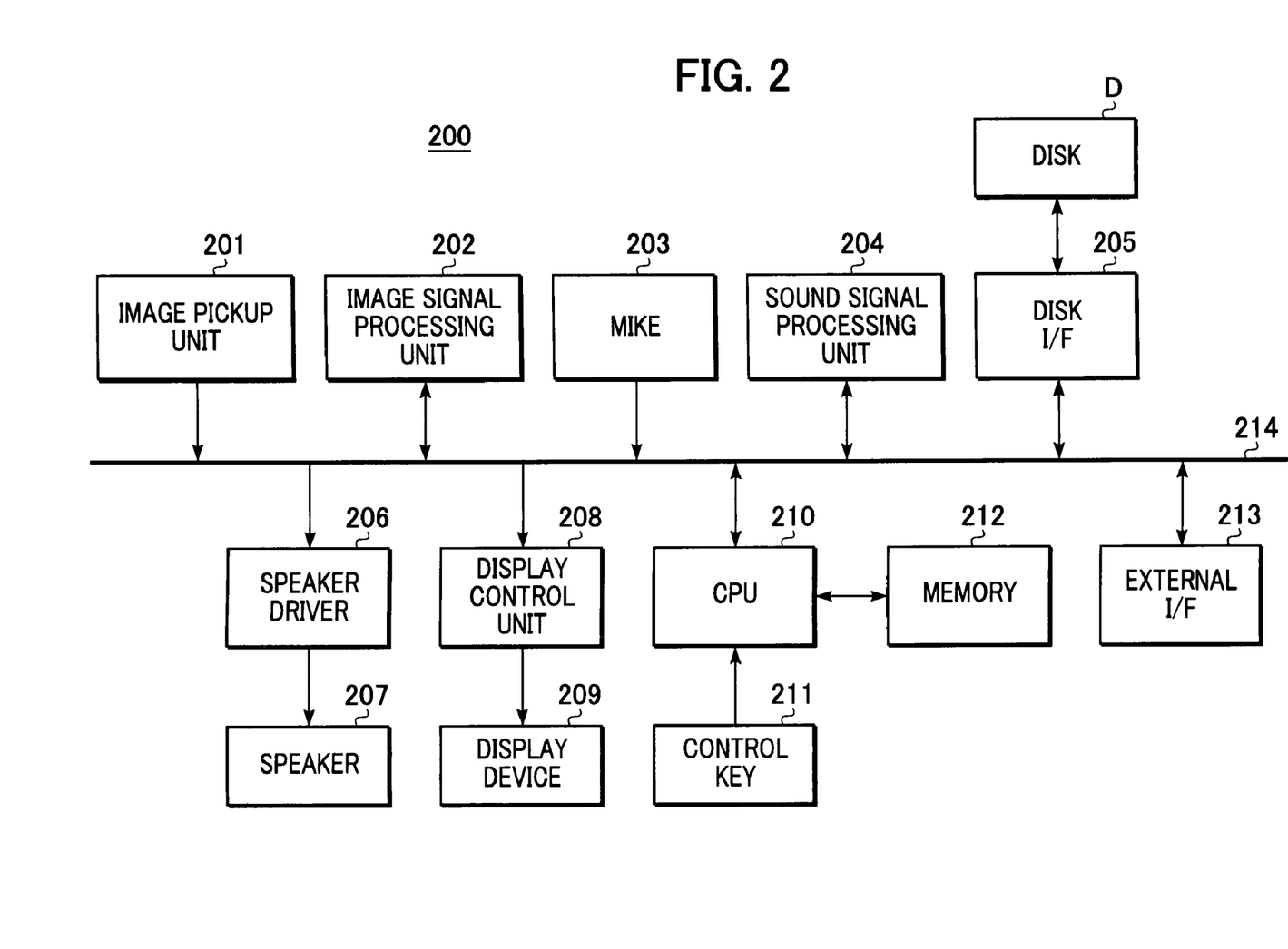
FIG. 2 is a block diagram of a reproducing apparatus according to an embodiment of the invention.

FIG. 1 is a conceptual drawing of a play list specific to the present invention and is described in more detail below. FIG. 2 is a block diagram of a reproducing apparatus 200 according to an embodiment of the present invention. The reproducing apparatus 200 is, for example, a digital video recorder using a disk such as a DVD, CD, or Blu-ray Disk as a storage medium.

The recording apparatus 200 operates in an image-taking mode and in a reproducing mode. As one of reproducing functions in the reproducing mode, the reproducing apparatus 200 is capable of reproducing the play list using the play list shown in FIG. 1.

In the image-taking mode, an image signal obtained by an image pickup unit 201 including a lens or an image pickup system is outputted to an image signal processing unit 202 and a display control unit 208 via a bus 214.

The image signal processing unit 202 generates encoded data by encoding the image signal using a known compression encoding method such as MPEG2 or 4 for a picked-up moving image, and by using a known compression encoding method such as JPEG for a still image. In this case, if the recording operation is being performed, the encoded data of the image is stored in a predetermined format on disk D (i.e., DVD or a Blu-ray Disk) through disk interface (I/F) 205 via the bus 214.

The display control unit 208 provides a display image relating to an image signal taken by the image pickup unit 201 on a display device 209 such as a liquid crystal monitor or the like in the image-taking mode.

A sound signal obtained by a microphone 203 in parallel with the image-taking operation is outputted to a sound signal processing unit 204 via the bus 214. The sound signal processing unit 204 generates encoded data by encoding the sound signal using a known sound compression encoding method such as MPEG-2/AAC. At this time, if the storing operation is being performed, the encoded sound data is stored in a predetermined recording format on the disk D through the disk interface (I/F) 205 via the bus 214.

The reproducing apparatus 200 is configured to be capable, as needed, of outputting encoded image or sound data through an external interface (I/F) 213 to an external apparatus or a network. In addition, it is also configured to be capable of recording encoded image or sound data externally supplied through the external I/F 213 or disk D.

In the image-taking mode, upon reception of an instruction to start recording supplied by a user through the operating key 211, a CPU 210 controls respective units. More specifically, the control signal for performing the storing operation of encoded image or sound data is outputted to the disk I/F 205 as described above, and a control signal for controlling rotation of the disk D or the movement of a storage head in accordance with the storing operation is outputted.

At this time, the control signal outputted from the CPU 210 to the disk I/F 205 includes, but is not limited to, various kinds of information relating to the image-taking state available at the image pickup unit 201, setting information relating to the quality of image or sound set at the image signal processing unit 202 or the sound signal processing unit 204, and information relating to the image-taking period. This information can be stored on the disk D together with the encoded image or sound data as additional information.

The CPU 210 controls the image signal processing unit 202 to extract an image signal for one frame from a moving image signal being taken upon reception of the instruction to start recording, and to generate a thumbnail image (i.e. an image reduced in size). The generated thumbnail image data is also outputted to the disk I/F 205 and stored on the disk D. The thumbnail images can be read when reproducing, and displayed together as a multiple display.

The disk I/F 205 includes an optical pickup, or a magnetic head and a mechanism therefor for writing and reading data onto the disk D, records and reproduces encoded image or sound data and control data for controlling recorded image or sound data as a file to/from the disk D based on control of file systems such as UDF or FAT. The structure of the file system includes management information for managing the file and file data such as images or sounds. By sharing the file system, information can be stored or reproduced in different storage media or compatible storing and reproducing devices.

Subsequently, in the reproducing mode, when the normal reproducing operation is being performed, encoded image or sound data read from the disk D by the disk I/F 205 under the control of the CPU 210 is reproduced independently or continuously in a file-to-file basis Encoded image data is decoded at the image signal processing unit 202 via the bus 214 and encoded sound data is decoded at the sound signal processing unit 204. The image signal is then displayed by the display control unit 208 on the display device 209 as a reproduced image, while the sound signal is outputted by a speaker driver 206 through a speaker 207 as a reproduced sound.

In the reproducing mode, upon reception of an instruction to reproduce the play list supplied by a user through the operating key 211, the CPU 210 controls respective units and executes a reproduction of the play list (i.e., reproduction of a program) based on the play list read out from the disk D or a memory 212. Encoded image data, including given scenes reproduced by reproducing the play list, is decoded at the image signal processing unit 202 via the bus 214 and encoded sound data is decoded at the sound signal processing unit 204. The image signal is then displayed on the display device 209 by the display control unit 208 as a reproduced image, while the sound signal is outputted through the speaker 207 by the speaker driver 206 as a reproduced sound.

The play list here means a list file (a binary file may also be applicable) for specifying procedures for reproducing various information files such as images (e.g., moving image, still image) or sounds stored on the disk D, and describes given reproducing divisions, given reproducing routes, various reproducing effect functions, linking functions in given positions or divisions, and so on. The reproducing apparatus 200 is capable, via the CPU 210 the control key 211, and the memory 212, of preparing a new play list or editing an existing play list of image or sound data stored in the disk D.

Figure 3:
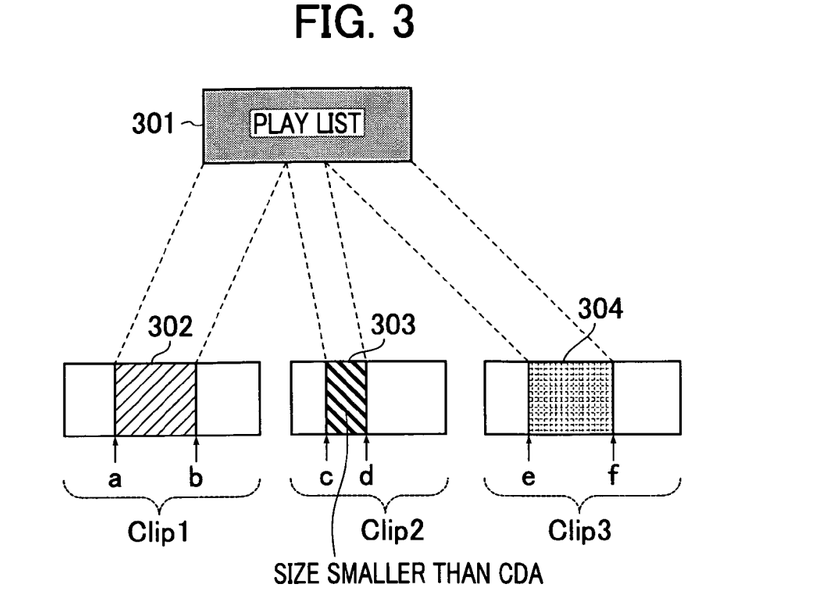
FIG. 3 is a conceptual drawing of a play list (normal play list) before editing used in the embodiment of the invention.
Figure 4:
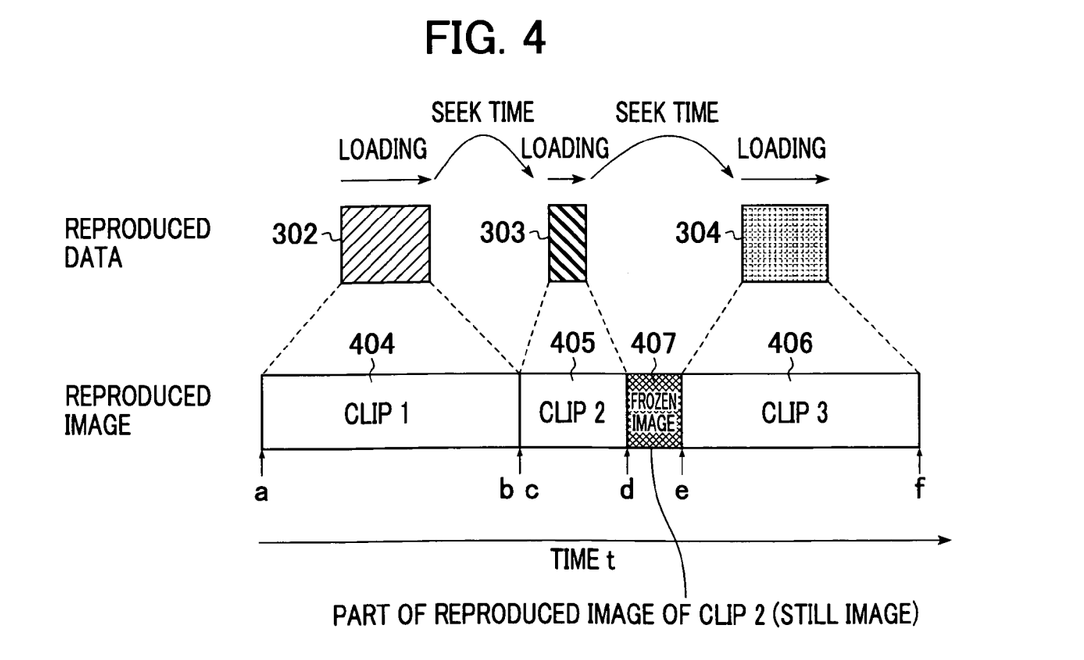
FIG. 4 is a drawing showing a reproducing operation when the play list in FIG. 3 is used.

Next, the configuration of the play list according to the present invention will be described. The configuration of a normal play list will be described first. FIG. 3 is a conceptual drawing of a normal play list. FIG. 4 is an image drawing of a reproducing operation when the play list in FIG. 3 is used, while FIG. 5 is a drawing showing a configuration of the play list in FIG. 3.

Referring to FIG. 3, reference numeral 301 is a play list containing one or more clip names of moving images to be referred, and reproduction start time and termination time for each clip. The play list 301 includes the respective clip names and their reproduction start time and reproduction termination time (a-f), and indicates that a division a-b 302 is referred from a clip 1, a division c-d 303 is referred from a clip 2, and a division e-f 304 is referred from a clip 3, as the reproducing divisions, respectively.

More specifically, the clips 1, 2, 3 are video/audio data stored by the reproducing apparatus 200, and are moving image files, including corresponding sounds, in which the image being taken is recorded during a period from the record-start operation to the record-stop operation according to the operation of the user. Reference numeral 302 designates video/audio data in the clip 1 referred by the play list 301 from the start time a to the termination time b. In the same manner, reference numeral 303 designates video/audio data from the start time c to the termination time d in the clip 2 to be referred by the play list 301, and reference numeral 304 designates video/audio data from the start time e to the termination time f in the clip 3 to be referred by the play list 301.

Figure 5:
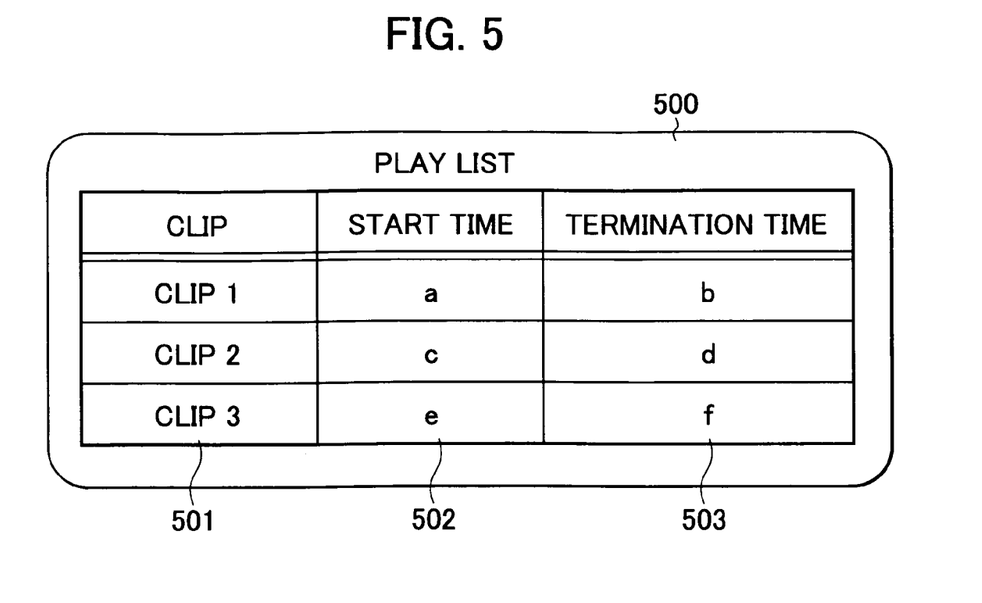
FIG. 5 is a drawing showing a configuration of the play list in FIG. 3.

The configuration of the play list 301 is shown in FIG. 5. FIG. 5 is a list display 500 showing a configuration of the play list 301. The list display 500 can be displayed on the display device 209. In FIG. 5, reference numeral 501 designates a clip name containing video/audio data to be referred by the play list, reference numeral 502 designates a start time of the reproducing division in each clip to be referred by the play list, and reference numeral 503 designates a termination time of the same.

Reproduction of the play list means to reproduce the plurality of clips to be referred continuously from the start time to the termination time based on the loaded play list. When the play list 301 is used, video/audio data 302 from the timing a to the timing b in the clip 1 is reproduced upon start of reproduction, then video/audio data 303 from the timing c to the timing d in the clip 2 is reproduced, and subsequently, the video/audio data from the timing e to the timing f in the clip 3 is reproduced continuously, and then terminated or reversed.

When part of a scene to be referred by the play list 301 shown in FIG. 3 (e.g., the division from c to d in the clip 2) has a size smaller than the CDA, the reproducing operation of the reproducing apparatus 200 will be as shown in FIG. 4.

Each clip is a block of data stored in a continuous logical sector. When reproducing the play list, loading of data required for reproducing the play list is performed by loading data of specified duration in a clip from the storage medium (i.e., disk), then loading data in the next clip, and then loading data of a specified duration in the clips successively.

In this case, when moving from a clip to another clip, an operation called "seek", in which the number of revolutions of the disk is changed and the optical pickup is significantly moved, is performed. The time duration required for moving from one clip to another clip is a "seek time" shown as shown in FIG. 4. During this time, data cannot be taken from the driver, but reproduction of video/audio is continuously performed. A minimum data length which can guarantee continuous reproduction of video/audio without breaking-up is, so-called CDA.

Therefore, when the length of video/audio data 303 from the start time c to the termination time d in the clip 2 as shown in FIG. 3 is shorter than the CDA, a division 407, during which a frozen image is displayed, is inserted as shown in FIG. 4.

The frozen image displays part of the reproduced image in the clip 2 continuously as a still image. For example, it may hold the image immediately before freezing (i.e., image decoded last in the clip 2). Alternatively, the frozen image is switched to a reproduced image in the clip 3 when decoding of the next clip 3 is initiated and the reproduced image is outputted.

A reproducing operation will not be described in the context of FIGS. 3 and 4. First, data 302 from the timing a to the timing b in the clip 1 is loaded and reproduced image and reproduced sound 404 corresponding thereto are reproduced. Then, continuously, data 303 from the timing c to the timing d in the clip 2 is loaded, and reproduced image and reproduced sound 405 corresponding thereto is reproduced. At this time, part of the reproduced image in the clip 2 is continuously displayed as a still image as the frozen division 407, and then data 304 from the timing e to the timing f in the clip 3 is read and reproduced image and reproduced sound 406 corresponding thereto are reproduced. By inserting the frozen image intentionally in this manner, continuous reproducing can be maintained without outputting degraded video after reproducing video/audio data 303, which is smaller than the CDA.

In addition, with the reproducing apparatus 200 of the present invention, by editing the above-described normal play list and preparing a specific play list, continuous reproduction is achieved while avoiding the above-described frozen division.

Figure 6:
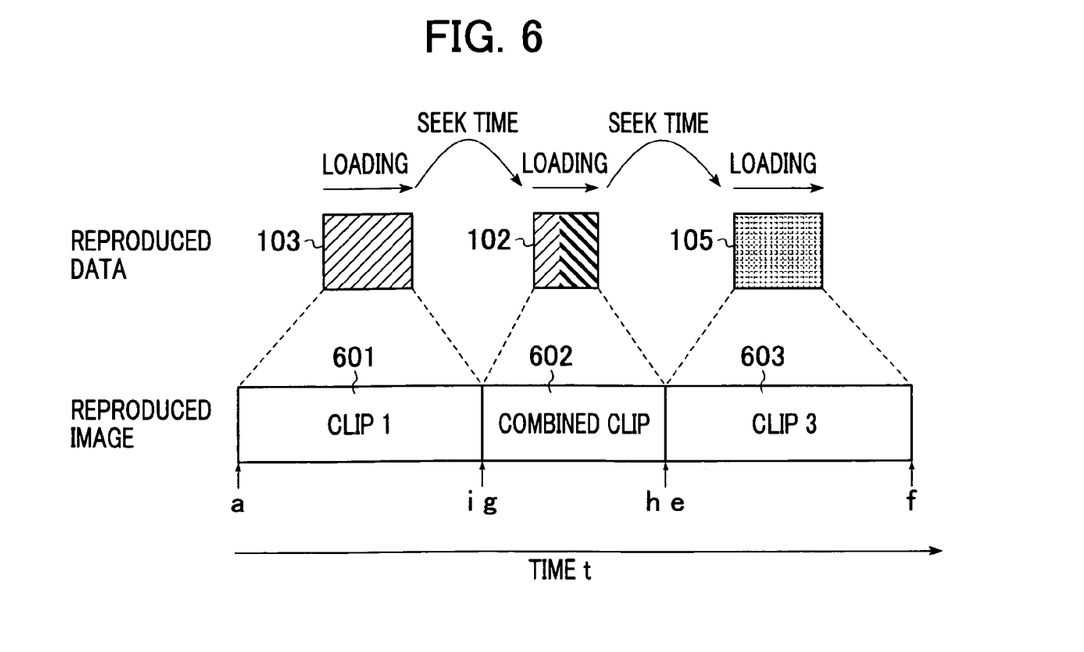
FIG. 6 is a drawing showing the reproducing operation when the play list in FIG. 1 is used.
Figure 7:
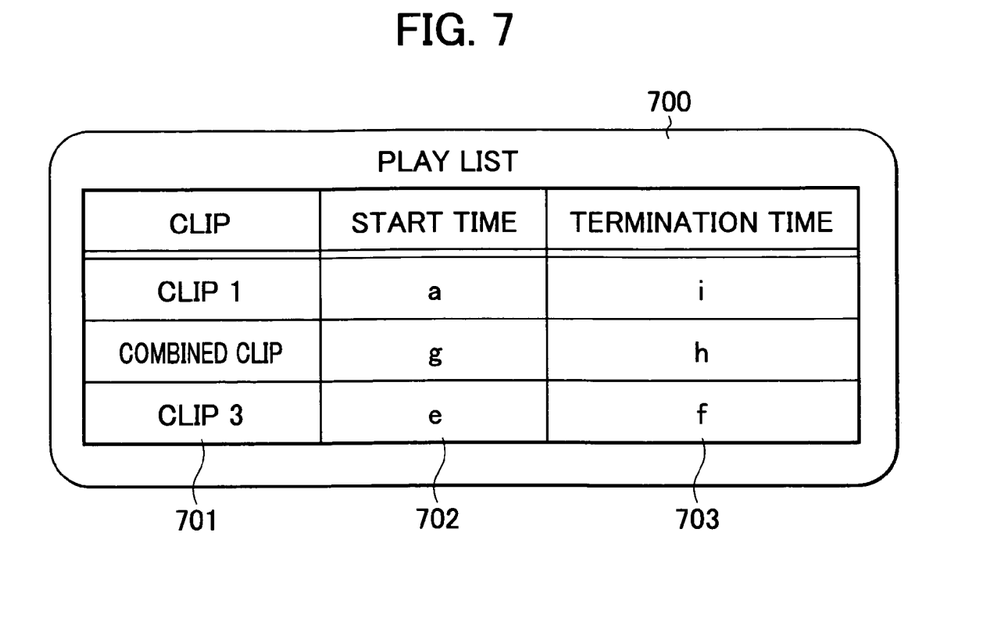
FIG. 7 is a drawing showing a configuration of the play list in FIG. 1.

A conceptual diagram of the specific play list prepared by the reproducing apparatus 200 of the invention is shown in FIG. 1. An image diagram of a reproducing operation using the play list in FIG. 1 is shown in FIG. 6, and a diagram showing a configuration of the play list in FIG. 1 is shown in FIG. 7.

In FIG. 1, reference numeral 101 designates a play list, and contains one or more clip names of moving images to be referred and the reproduction start time and the reproduction termination time of the respective clips. It is presumed that the a-i 103 and i-b 106 divisions from the clip 1, the c-d division 104 from the clip 2, and the e-f division 105 from the clip 3 are referred respectively as the reproducing divisions, and the respective clip names and the reproduction start and termination time (a-f) are written in the play list 101 before being edited.

The clips 1, 2, and 3 are video/audio data stored by the reproducing apparatus 200, and are moving image files, including corresponding sounds, in which the image being taken is recorded during a period from the record-start operation to the record-stop operation according to the operation of the user.

At this time, if reproduction is made based on the play list 101 before being edited, under normal conditions, video/audio data 103, 106 from the timing a to the timing b in the clip 1 are reproduced upon starting of the reproduction, then video/audio data 104 from the timing c to the timing d in the clip 2 is reproduced, and subsequently, video/audio data 105 from the timing e to the timing f in the clip 3 is reproduced. Then, the operation is terminated or reversed. However, if there is a portion to be referred which is smaller than the CDA in part of the division, continuous reproduction is disconnected for the reason described above.

Therefore, as shown in FIG. 1, when the length of video/audio data 104 from the timing c to the timing d in the clip 2 is smaller than the CDA, a combined clip 102 is generated. Then, the play list 101 before being edited is edited in such a manner that the target to be referred by the play list is changed by replacing the portion which may cause an interference of the continuous reproduction with the generated combined clip 102. Consequently, even in the case where there is a division shorter than the length of the CDA, continuous reproduction of the play list is achieved while avoiding the case which may cause freezing.

The combined clip 102 is generated by combining video/audio data 104 from the timing c to the timing d in the clip 2, which has a size (length) smaller than the CDA referred by the play list 101, and part of video/audio data being referred by the play list 101 and is reproduced immediately before c or immediately after d. FIG. 1 shows an example in which video/audio data 106 included in the division from the timing i (a ≦ i <b) to the timing b in the clip 1 is extracted and combined with video/audio data 104 from the timing c to the timing d to generate the combined clip 102 in order to combine video/audio data from c to d, which is shorter than the length of the CDA, and video/audio data immediately before c. The combined clip 102 is generated in the image signal processing unit 202 and the sound signal processing unit 204 using data already stored in the disk D under the control of the CPU 102. The generated combined clip 102 is stored in the storage medium (e.g., a predetermined area in the disk D or the memory 212 in FIG. 2) so as to be capable of being read at any time. It is also possible to store the combined clip 102 at the position where the play list is stored.

The play list 101 is modified (edited) so as to refer the generated combined clip 102 from the start time g (timing in the clip 1 corresponding to i) to the termination time h (timing in the clip 2 corresponding to d). Eventually, the a-i division 103 from the clip 1, the g-h division 102 from the combined clip, and the e-f division 105 from the clip 3 are referred respectively so as to be continuously reproduced as reproducing divisions. The respective clip names and the reproduction start time and the reproduction termination time are written in the play list 101. In this arrangement, the play list 101, in which only the target to be referred is changed, is completed while maintaining the order of reproduction which is the same as the order of reproduction according to the play list before being edited.

Figure 8:
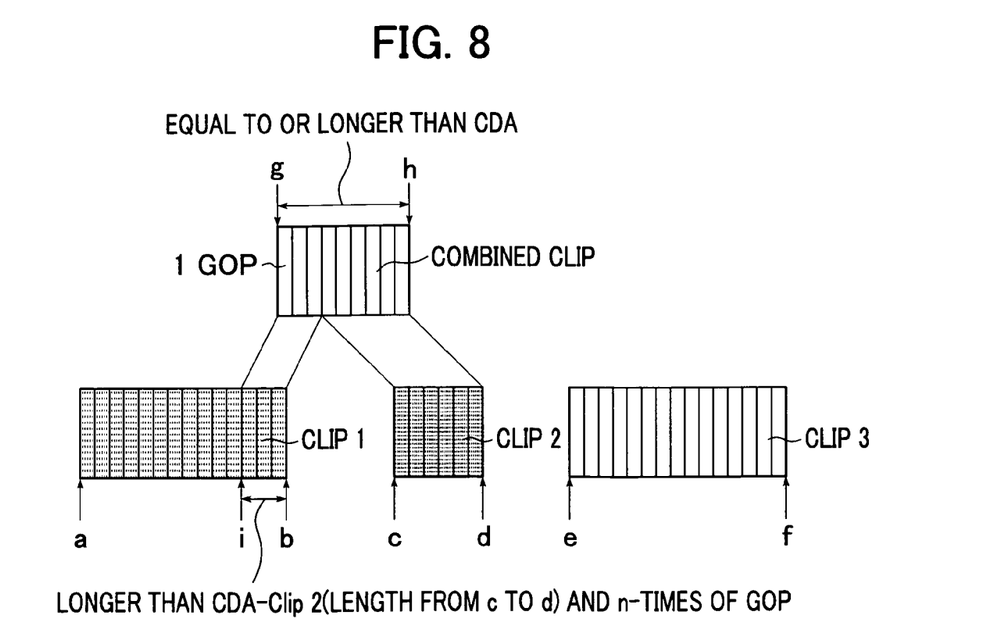
FIG. 8 is a drawing showing preparation of a combined clip in the embodiment of the invention.

FIG. 8 is an enlarged view showing the preparation of the combined clip. The size of video/audio data 106 from the timing i to the timing b in the clip 1 has a length longer than the size obtained by subtracting the size of video/audio data 104 from the timing c to the timing d in the clip 2 from the size of the CDA, and a length which is n-times the GOP (Group of Pictures) which is a MPEG data unit. Furthermore, the combined clip 102 has a size longer than the CDA, and the smallest size in GOP unit. Also, the combined clip 102 is stored in the disk D or in the memory 212 in a file type, such as "temp file", in order to distinguish from other clips of video or audio so that it cannot be viewed by the user, thereby preventing modification or deletion.

FIG. 7 shows the configuration of the completed play list 101 in a list display 700. The display 700 can be displayed in the display device 209. In FIG. 7, reference numeral 701 designates a clip name in which video/audio data to be referred is stored in the play list, reference numeral 702 designates the start time of the reproducing division to be referred in the respective clips in the play list, and reference numeral 703 designates the termination time of the same.

Reproduction of the play list is performed continuously from the start time to the termination time of each of the plurality of clips to be referred based on the loaded play list. In the play list 101, it is written to reproduce video/audio data 103 from the timing a to the timing i in the clip 1 upon starting reproduction, then, reproduce video/audio data from the timing g to the timing h in the combined clip, and subsequently reproduce video/audio data from the timing e to the timing f in the clip 3 consecutively.

In this manner, by using the combined clip, the same reproduction as the case in which video/audio data from the timing a to the timing b in the clip 1 is reproduced, then video/audio data from the timing c to the timing d in the clip 2 is reproduced, and then video/audio data from the timing e to the timing f in the clip 3 is reproduced consecutively, is achieved.

Turning to FIG. 6, the play list reproducing operation based on a play list prepared using the combined clip 102 will be described. A reproducing video and audio 601 relating to data 103 from the timing a to the timing i in the clip 1 are reproduced, then a reproducing video and audio 602 relating to data 102 from the timing g to the timing h in the combined clip are reproduced consecutively, and a reproducing video and audio 603 relating to data 105 from the timing e to the timing f in the clip 3 are reproduced consecutively.

In FIG. 6, since the newly generated combined clip is used rather than the video/audio data from the timing c to the timing d in the clip 2, video/audio data 103 from the timing a to the timing i in the clip 1, video/audio data 102 from the timing g to the timing h in the combined clip, and video/audio data 105 from the timing e to the timing f in the clip 3 all have a size larger than the CDA. Thus, a series of data can be reproduced continuously without blocking up of the reproducing data even during seek time.

Although an example in which data having a length shorter than the CDA is combined with data immediately before is described in the configuration of the combined clip described above, combining with data immediately after can easily be achieved from the configuration of the present embodiment. For example, generation of the combined clip by combining video/audio data 104 from the timing c to the timing d in the clip 2 with the following front part of the clip 3 from the timing e to the timing f on the play list, or by combining video/audio data 104 with the following part of the plurality of clips, is also included in the scope of the embodiment.

The combined clip is deleted when the corresponding play list is renewed, deleted, or when the corresponding scene is cut.

As described thus far, according to the present embodiment, even when a scene having a length shorter than the CDA is specified to be referred by the play list, continuous reproduction without freezing is achieved, because when the length of data of video/audio data 104 referred by the play list 101 is smaller that that of the CDA, a new combined clip 102 having the length equal to or longer than the CDA is generated by combining video/audio data 104 with continuing part of another clip which is referred by the play list 101 (.g., data in the division 106), and the target to be referred is changed to the generated combined clip 102 by editing the play list 101.

Since the combined clip is larger than the CDA and is the smallest size in GOP unit, it can be deleted when it is no longer necessary to be referred, and thus the capacity of the storage medium is not wasted. In addition, since it cannot be viewed by the user, the user can freely prepare a play list without caring about the concept of the CDA.

<Other Embodiments> Note that the invention can be implemented by supplying a software program which implements the functions of the foregoing embodiments directly or indirectly to a system or apparatus, reading the supplied program code with a computer of the system or apparatus and then executing the program code. In this case, as long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

As long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, a Blu-ray DISC, and a DVD (a DVD-ROM, a DVD-R, and a DVD-RW).

As for the method of supplying the program, a client computer can be connected to a website on the Internet using a browser of the client computer. The computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium, such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A reproducing apparatus which can reproduce image data stored in a storage medium according to a play list in which a procedure of reproduction is specified comprising:
    a generating unit for combining a first image data to be referred in said play list with part of or an entire second image data to be referred in said play list for generating a combined clip; and
    a reproducing unit which reproduces said combined clip when reproducing according to said play list if the length of said first image data to be referred in said play list is shorter than a predetermined length,
    wherein said predetermined length is equal to the minimum data length allowed when storing said image data on said storage medium.

2. An apparatus according to claim 1, wherein said storage medium is a disk and the minimum data length is the smallest storage unit enabling continuous reproduction of video or audio data.

3. An apparatus according to claim 1, wherein said generating unit generates said combined clip having a data length equal to or longer than the minimum data length allowed for storing said image data on said storage medium.

4. An apparatus according to claim 3, wherein said storage medium is a disk and the minimum data length is the smallest storage unit enabling continuous reproduction of video or audio data.

5. An apparatus according to claim 1, wherein said generating unit generates a combined clip having a data length equal to or longer than the minimum data length allowed for storing said image data on said storage medium, as well as a length of n-times a GOP, wherein GOP is a MPEG data unit.

6. An apparatus according to claim 1, further comprising a storage unit for storing said combined clip in said storage medium.

7. An apparatus according to claim 1, further comprising a storage unit for storing said combined clip in another storage medium different from said storage medium.

8. An apparatus according to claim 1, further comprising a storage unit for storing said combined clip in the storage medium in which said play list is stored.

9. An apparatus according to claim 1, further comprising a storage unit for storing said combined clip in a state in which operation of the apparatus by the user is restricted.

10. A reproducing apparatus which can reproduce image data stored in a storage medium according to a play list in which a reproducing procedure is specified comprising:
    an output unit for outputting still image data at boundaries between a plurality of image data when reproducing; and
    a reproducing unit which reproduces said still image data following the reproduction of the image data when reproducing according to said play list if the length of the image data to be referred in said play list is shorter than a predetermined length,
    wherein said predetermined length is equal to the minimum data length allowed when storing said image data on said storage medium.

11. An apparatus according to claim 10, wherein said output unit outputs said still image data obtained from the image data reproduced immediately before the still image.

12. An apparatus according to claim 11, wherein said storage medium is a disk and said minimum data length is the smallest storage unit enabling continuous reproduction of video or audio data.

* * * * *